(12) United States Patent
Azuma

(10) Patent No.: US 9,113,096 B1
(45) Date of Patent: Aug. 18, 2015

(54) SINGLE SENSOR TWO-SIDED CAMERA

(71) Applicant: Amazon Technologies, Inc., Reno, NV (US)

(72) Inventor: Eddie Alex Azuma, Pleasanton, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/319,501

(22) Filed: Jun. 30, 2014

(51) Int. Cl.
*H04N 5/335* (2011.01)
*H01L 21/70* (2006.01)

(52) U.S. Cl.
CPC .................................... *H04N 5/335* (2013.01)

(58) Field of Classification Search
CPC .................................................. H01L 27/0694

USPC ................................... 348/294, 308; 257/618
See application file for complete search history.

(56) References Cited

U.S. PATENT DOCUMENTS 6,150,708 A * 11/2000 Gardner et al. ................ 257/618
2013/0063641 A1* 3/2013 Venezia et al. ................. 348/308

FOREIGN PATENT DOCUMENTS

WO  2011149451 A1  12/2011

* cited by examiner

*Primary Examiner* — Joel Fosselman
(74) *Attorney, Agent, or Firm* — Seyfarth Shaw LLP

(57) ABSTRACT

A single dual-sided image sensor simultaneously captures discrete images from two different perspectives using both a front-side and a back-side of the image sensor. The two different perspectives are extracted from a composite image for processing. The two cameras, as configured in a device, face in a same direction and are spatially offset.

21 Claims, 10 Drawing Sheets

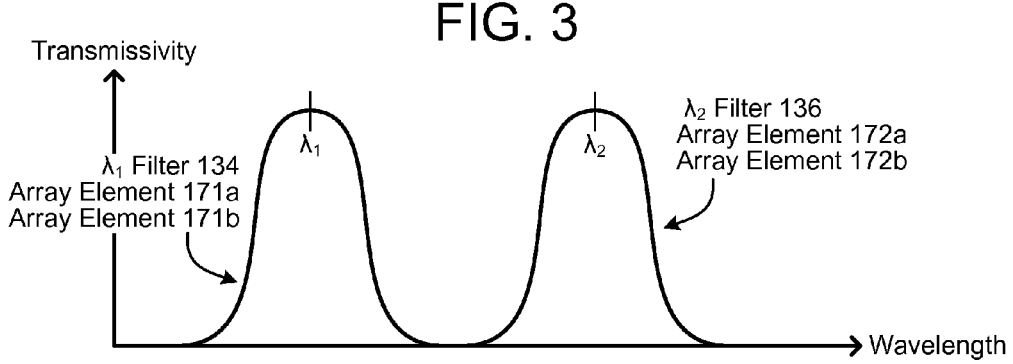

FIG. 7
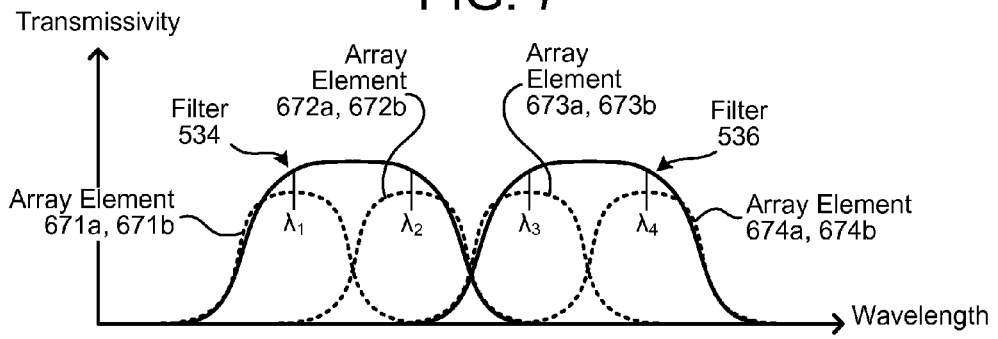
FIG. 8A
FIG. 8B
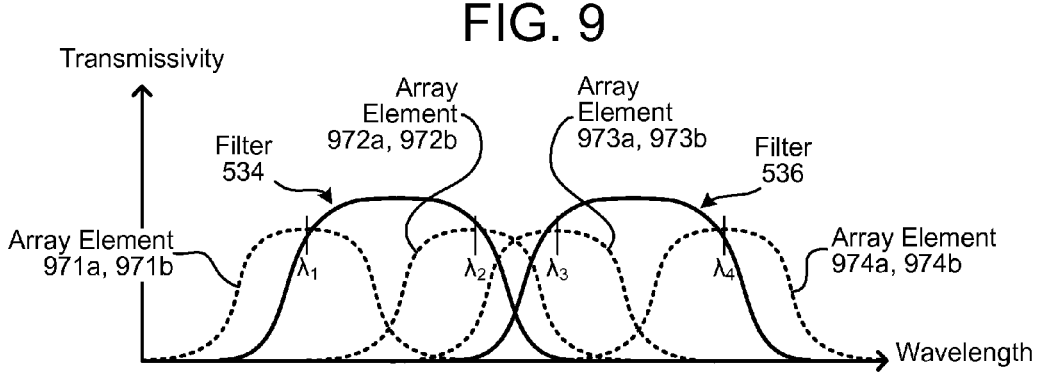
FIG. 9

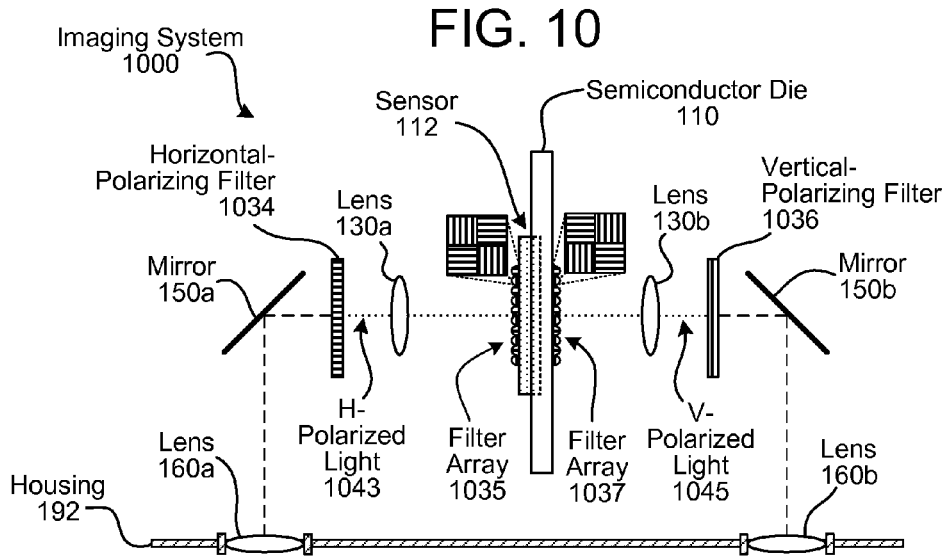

us 9,113,096 B1

SINGLE SENSOR TWO-SIDED CAMERA

BACKGROUND

Cameras have become a ubiquitous feature on mobile devices such as cellular telephones. Many such devices include multiple cameras, such as a high resolution camera on the back of the device for digital photography, and a lower resolution camera on the front of the device next to the display to support video telephony and the taking of self-portraits.

BRIEF DESCRIPTION OF DRAWINGS

For a more complete understanding of the present disclosure, reference is now made to the following description taken in conjunction with the accompanying drawings.

FIGS. 2A and 2B illustrate filter arrays that, in conjunction with front-side and back-side filters, enable the system of FIG. 1.

FIG. 3 illustrates an example of the wavelength-dependent transmissivity the filter array elements and filters used with the system of FIG. 1.

FIGS. 4A and 4B illustrate the image data from the front-side and the back-side of the image sensor in the system of FIG. 1.

FIG. 7 illustrates an example of the wavelength-dependent transmissivity the filter array elements and filters used with the system of FIG. 5.

FIGS. 8A and 8B illustrate the image data from the front-side and the back-side of the image sensor in the system of FIG. 5.

FIG. 9 illustrates high-pass and low-pass filtering between the filter array elements and filters using filter array elements with wider pass-bands than those illustrated in FIG. 7.

FIG. 10 illustrates a system similar to that in FIG. 1, but that uses polarized filter arrays.

FIGS. 11A and 11B illustrate the filter arrays used with the system in FIG. 10.

FIGS. 12A and 12B illustrate the image data from the front-side and the back-side of the image sensor in the system of FIG. 10.

Unless stated otherwise, the figures are not drawn to scale and the relative sizes of features are not proportional.

DETAILED DESCRIPTION

Space is at a premium inside mobile devices, where a difference in component sizes on the order of a few millimeters may require significant design trade-offs, impacting device features such as thickness, camera resolution, and battery capacity. Adding multiple cameras to a device entails dedicating space for additional optical systems (lenses, shutters, etc.), as well as the added space, power, and wiring requirements for an additional image sensor and control electronics.

Figure 1:
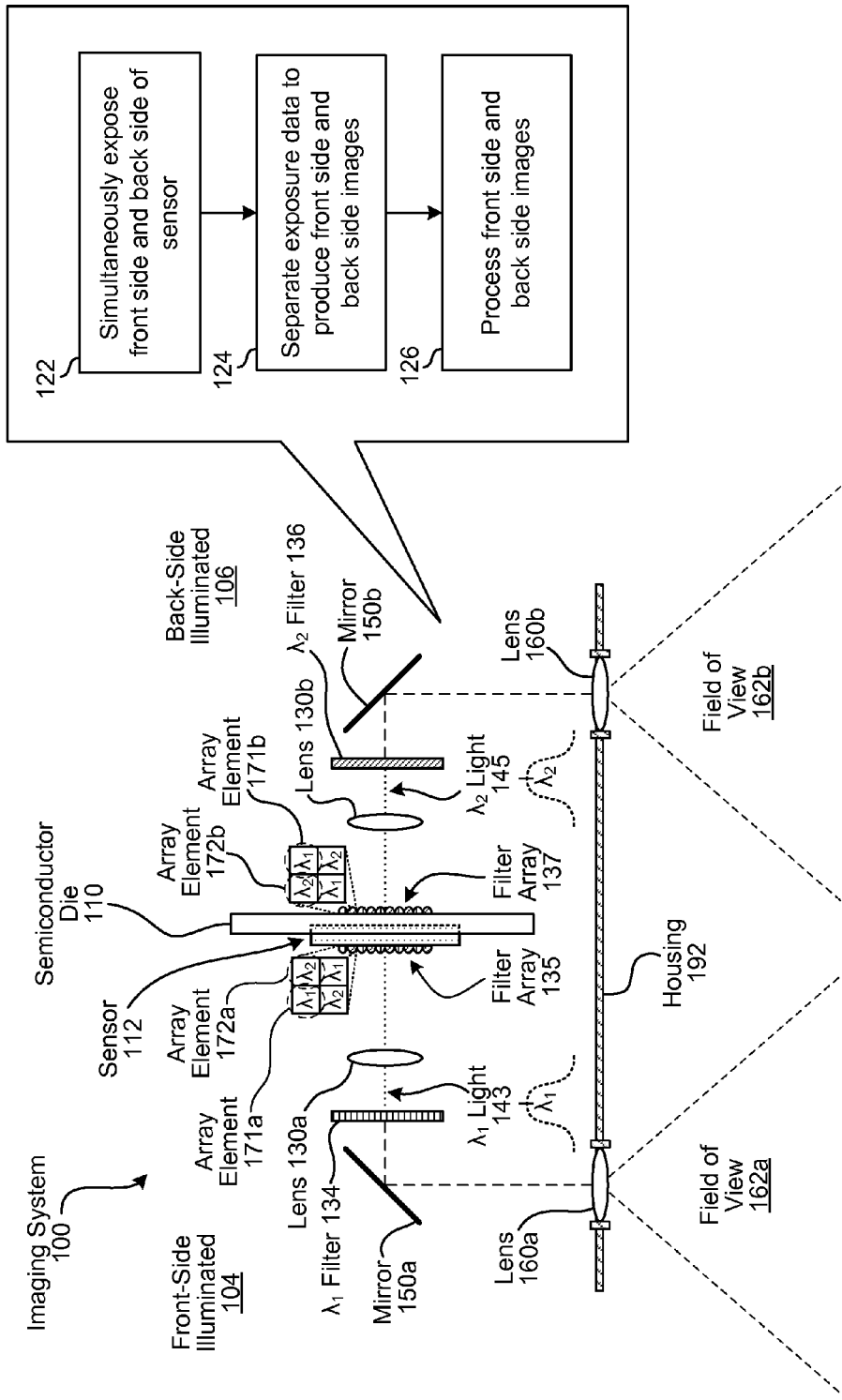
FIG. 1 illustrates a system for capturing images using both the front-side and back-side of a single image sensor.

FIG. 1 illustrates an imaging system 100 where a single image sensor 112 may serve as two cameras. The image sensor 112 is simultaneously (122) front-side illuminated (104) and back-side illuminated (106), producing composite image data. After the composite image data is read from the image sensor 112, the composite image data is separated (124) to produce a discrete front side image and a discrete back side image. The discrete images may then be processed (126) in various ways that ordinarily require two separate exposures, such as preparation of stereoscopic images, a composite enhanced image, distance determinations to an object in the images, etc.

To manufacturer an image sensor, multiple image sensors may be constructed on a surface of a semiconductor wafer (also known as a semiconductor substrate). The semiconductor wafer is then divided (e.g., sliced, diced, cut, or cleaved) into multiple smaller "dies." A die including an integrated circuit ("IC") (e.g., sensor 112) may also be referred to as a "chip." In the parlance of image sensors, light that is shone directly on the image sensor 112 (for example, light through lens 130a) is referred to "front-side illumination," and light that passes through the die 110 (for example, light through lens 130b) to reach the image sensor is referred to as "back-side illumination." Thus, the side of the sensor 112 facing the semiconductor die 110 may be referred to as the back side, while the other side of the sensor 112 may be referred to as the front side.

The front-side illuminated (104) side of the imaging system 100 may include an outer lens 160a connected to a housing 192 of a device, providing a field of view 162a. Light passes through lens 160a to a mirror 150a, to redirect a path of incident light to reach inner lens 130a and the front side of the sensor 112. Somewhere along the path, the incident light passes through a front-side filter 134. The filter 134 selectively allows light that is within a range of wavelengths centered around wavelength $\lambda_1$ to pass through (i.e., $\lambda_1$ light 143). As illustrated, the filter 134 is between the mirror 150a and the inner lens 130a.

Similarly, the back-side illuminated (106) side of the imaging system 100 may include an outer lens 160b connected to a housing 192 of a device, providing a different field of view 162b that overlaps with field of view 162a. Light passes through lens 160b to a mirror 150b, to redirect a path of incident light to reach inner lens 130b and pass through the semiconductor die 110 to the back side of the sensor 112. Somewhere along the path, the incident light passes through a back-side filter 136. The filter 136 selectively allows light that is within a range of wavelengths centered around wavelength $\lambda_2$ to pass through (i.e., $\lambda_2$ light 145). As illustrated, the filter 136 is between the mirror 150b and the inner lens 130b.

A filter array is arranged on each side of the sensor 112, and the arrangement of the array elements may match the arrangement of pixels in the underlying sensor 112. As illustrated, the front-side filter array 135 comprises alternating filter elements passing the first wavelength $\lambda_1$ (171a) or passing the second wavelength $\lambda_2$ (172a). The back-side filter array 137 comprises filter elements with an exact opposite mirror-image pattern, so that a pixel has an array element for $\lambda_1$ on both sides (171a on front side, 171b on back side), or has an array element for $\lambda_2$ on both sides (172a on front side, 172b on back side). FIGS. 2A and 2B illustrate a larger portion of the filter arrays 135, 137, and includes example row and column designations in relation to rows and columns of the pixels of the underlying sensor 112. A same row and column equates to an array element arranged to filter light to a photosensor of the sensor 112 having the illustrated row and column location.

By configuring a transmissivity of the front side filter 134 and back side filter 136 as illustrated in FIG. 3, light having the wavelength $\lambda_1$ (143) will be received by sensor pixels having $\lambda_1$ array elements in the filter array 135, while wavelength $\lambda_2$ will not reach the front-side of the sensor. Likewise, light having the wavelength $\lambda_2$ (145) will be received by sensor pixels having $\lambda_2$ array elements in the filter array 137, while wavelength $\lambda_1$ will not reach the back-side of the sensor. FIGS. 4A and 4B illustrate the result image data from the front-side (481) and the back-side (482), where a grey box indicates that no data was received from the respective side.

For example, if $\lambda_1$ corresponds to the color blue and $\lambda_2$ corresponds to the color red, only blue light will be recorded from the front-side of the image sensor, and only red light will be recorded from the back-side of the image sensor. Even though the $\lambda_1$ filter 134 substantially attenuates (i.e., effectively blocks) light in the $\lambda_2$ wavelength band, having $\lambda_2$ array elements 172a in the filter array 135 mitigates any leakage of light in the $\lambda_2$ wavelength band that might reach the front side of the image sensor, either by bypassing the system's front-side optics or resulting from the leakage from the back side of the die 110 to the front side of the sensor 112. Likewise, Even though the $\lambda_2$ filter 136 blocks light in the $\lambda_1$ wavelength band, having $\lambda_1$ array elements 171b in the filter array 137 mitigates any leakage of light in the $\lambda_1$ wavelength band that might reach the back side of the image sensor.

A wavelength "band" of light is a range of wavelengths associated with visible and/or non-visible light. For example, FIG. 3 illustrates transmissivity "pass" bands centered on wavelengths $\lambda_1$ and $\lambda_2$, as the illustrated curves represent the ranges of wavelengths (i.e., the bands) that the respective filters will pass. Visible wavelength bands typically are bands within a range of three-hundred ninety to seven-hundred nanometers (390-700 nm), with "red" being a band of approximately six-hundred twenty to seven-hundred nanometers (620-700 nm), "green" being a band of approximately four-hundred ninety five to five-hundred seventy nanometers (495-570 nm), and "blue" being a band of approximately four-hundred fifty to four-hundred ninety five nanometers (450-495 nm). Infrared (an example of non-visible light) comprises bands of light in the range from seven hundred nanometers to one millimeter (700 nm-1 mm).

The term "band" refers to a generalized range and does not necessarily refer to specific wavelengths, although red, green, and blue filters are often associated with particular ranges. A band may encompass both visible and invisible light, such as a band that includes red and some of the infrared spectrum. The wavelength bands used by the individual filters herein may have ranges in the visible spectrum, the non-visible spectrum, or a combination thereof, and a system may include a mix of filters that pass light in visible and/or non-visible bands.

The filter arrays 135 and 137 may have elements for more than two wavelength bands. For example, a three-color filter array conventionally used with image sensors is a Bayer filter. A Bayer filter is a mosaic color filter array arranged with red, green, and blue color filter elements arranged on a square grid of photodetectors (e.g., photosensors, photo diodes, sensor pixels). A first Bayer filter may be arranged as the filter array 135 on the front side of the sensor 112. A second Bayer filter with an opposite pattern of elements (i.e., a mirror image arrangement) may be arranged as the filter array 137 on the back side of the sensor 112. By tuning front side filter 143 to pass blue and green, and tuning back side filter 145 to tune red, the image data from the front side will include blue and green data, whereas the image data from the back side will include red data.

The photodetectors of the image sensor 112 do not independently record a wavelength of incident light, but rather, record a magnitude of incident light. If no color filters are included, for example, the resulting data would correspond to a black-and-white greyscale image. Instead, it is the color filters that are responsible for the data from a photosensor being read as a particular color. So if it is known that a photosensor is aligned with a red filter, the pixel data will be interpreted as red, and if it is known that a photosensor is aligned with a blue filter, the pixel data will be interpreted as blue, and so on. Thus, the "color" of data is based on the location of the photosensor in the image sensor's grid and the associated filters, rather than the data read from the photosensor.

The arrangement of wavelengths of bands passed by the filters 134, 135, 136, and 137 may be different than that shown in FIG. 3, and the pass bands may have some overlap (e.g., overlapping transmissivity curve "tails" as the transmissivity approaches zero). Such overlap is common in Bayer filters, where for instance, the "tail" of a blue filter transmissivity curve may overlap a tail of a green filter transmissivity curve.

Figure 5:
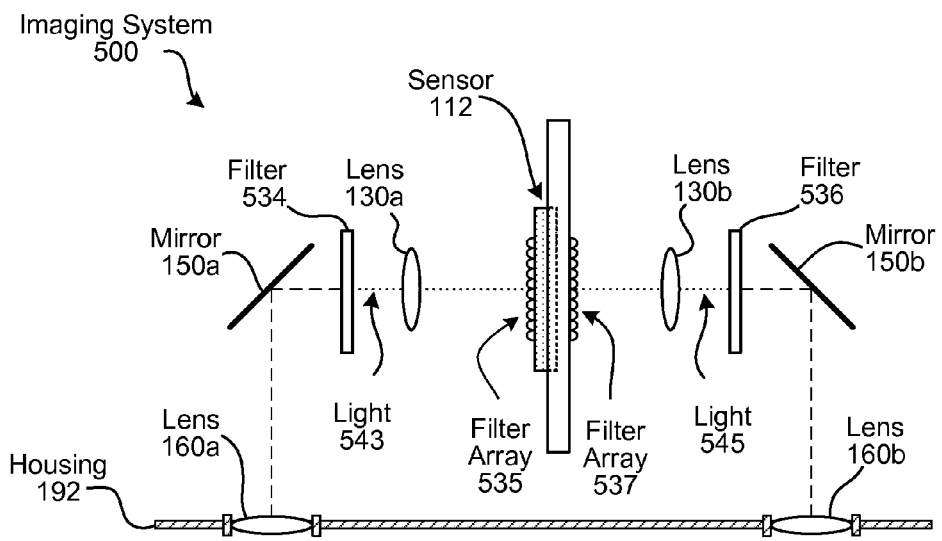
FIG. 5 illustrates a system similar to that in FIG. 1, but that includes more complex filter arrays.
Figures 6A, 6B:
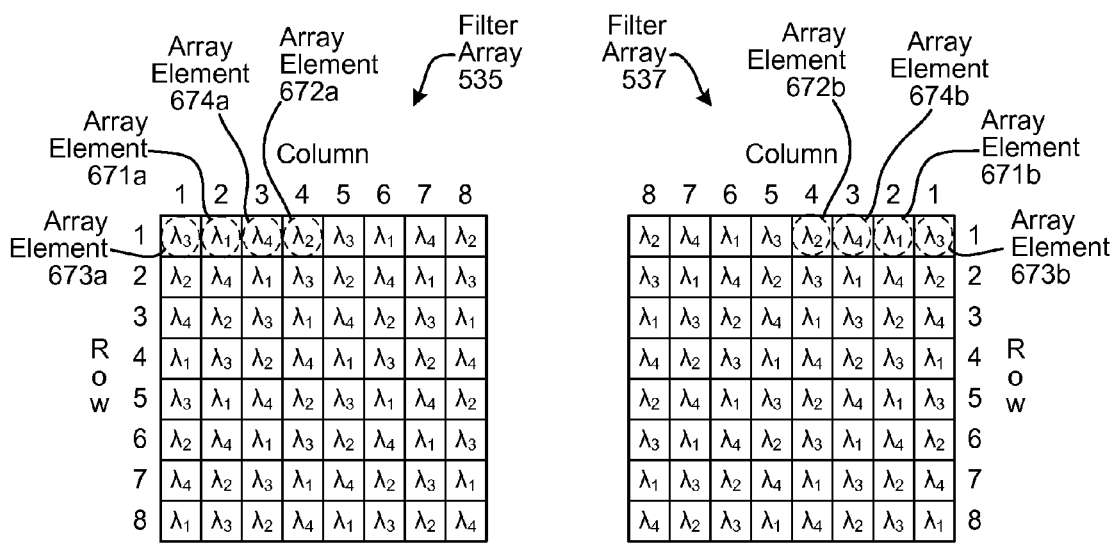
FIGS. 6A and 6B illustrate the filter arrays used with the system in FIG. 5.

FIG. 5 illustrates a system 500 like that in FIG. 1, but building on the Bayer filter example, includes filter arrays 535 and 537 with array elements configured for four different wavelength bands, as illustrated in FIGS. 6A and 6B. As illustrated in FIG. 7, the front-side filter 534 is configured to pass both a first wavelength $\lambda_1$ and a second wavelength $\lambda_2$, whereas the back-side filter 536 is configured to pass both a third wavelength $\lambda_3$ and a fourth wavelength $\lambda_4$. The result, as illustrated in FIG. 8, is that image data from the front-side (881) comes from photodetectors aligned with $\lambda_1$ array elements 671a and from photodetectors aligned with $\lambda_2$ array elements 672a, and image data from the back-side (882) comes from photodetectors aligned with $\lambda_3$ array elements 673b and from photodetectors aligned with $\lambda_4$ array elements 674b. So instead of having a "color" gamut derived from three filter colors (e.g., red, green, blue), the system 500 has a gamut derived from four filter "colors" (although a color gamut is only an example, as some or all of the wavelength bands may include infrared wavelengths).

However, the two sides of the image sensor can have photodetectors arranges to detect a different number of wavelength bands. For example, if all of the filter elements in FIGS. 6A and 6B having the $\lambda_4$ pass band are replaced with $\lambda_3$ filter elements, the image data from the front side (881) would include data from pixels of two different wavelength bands ($\lambda_1$, $\lambda_2$), whereas the image data from the back side (882) would include data from pixels of a single wavelength band ($\lambda_3$). In this same manner, the image sensor may collect data corresponding to a different number of wavelength bands on each side (with one or more bands on each side).

The pass bands of the filters 534, 536 do not necessarily need to align with the pass bands of the filter elements of the filter arrays, as illustrated in FIG. 9. As illustrated, the front side filter 534 and the back side filter 536 are the same as in system 500, but the while the wavelength bands of the array elements 671a to 674d and 671b to 674b overlap with the filters 534 and 536, they are transmissive to a broader range of wavelengths. Since the filters 534 and 536 control the range of light that reaches each filter array, cutting off (i.e., substantially attenuating) unwanted wavelengths, the large overlap between filter array elements for $\lambda_2$ and for $\lambda_3$ does not appreciably alter the results from those described with system 500 due to the filters 534 and 536 cutting off the overlapping wavelengths on each filter's respective side.

FIG. 10 illustrates a system 1000 like that in FIG. 1, but which filters based on polarization of light rather than wavelength. Polarization is a property of waves that can oscillate with more than one orientation. Electromagnetic waves, such as light, exhibit polarization. By passing light through a linear polarizing filter, the filter transmits waves having a same polarization orientation as the filter and substantially attenuates waves having a polarity that is perpendicular orientation of the filter. Light with intermediate orientations of polarization may be passed with varying degrees of transmissivity and attenuation. When two filters are arranged in series with perpendicular linear polarization orientations, substantially no light will pass through the combination, whereas when two filters are arranged in series with parallel linear polarization orientations, light will pass through the combination.

In FIG. 10, the front-side filter is a linear polarizing filter 1034 with a horizontal orientation, and the back-side filter is a linear polarizing filter 1036 with a vertical orientation that is perpendicular to the horizontal orientation. The filter arrays 1035 and 1037 have some array elements with vertical orientation and some array elements with horizontal orientation. As shown in FIGS. 12A and 12B, this produces image data from the front-side (1281) only from photodetectors aligned with array elements having a horizontal orientation, and from the back-side (1282) only from photodetectors aligned with array elements having a vertical orientation.

As noted above, individual photodetectors of the image sensor 112 do not detect "color," such that the arrangement in system 1000 would produce black-and-white images, absent additional filtering. This may be accomplished by also including one or more color filters on each side of the image sensor 112. For example, specific horizontal polarized pixels elements may be associated with red, green, and blue, and specific vertical polarized pixels elements may be associated with red, green, and blue. Since it is polarization and not color that determines which data originated on which side, the pattern of color pixels on each side may be independent from the other (i.e., something other than the opposite mirror-image arrangement where blue is aligned with blue and red is aligned with red, as discussed with systems 100 and 500). These color filters may be arranged with the polarizing filters 1034, 1036, may be arranged with the filter arrays 1035, 1037, or may be arranged somewhere else in the optical path of light that illuminates the respective sides of the sensor 112.

In the context of polarization, the terms "Vertical" and "Horizontal" are used as a matter of convenience to convey that the linear polarizations are perpendicular to each other, and do not refer to any particular frame of reference.

FIGS. 13A to 15B illustrate examples of filter arrays that enable discrete image data to be discerned from each side of the imaging system independent of the front side filter 134 and back side filter 136.

Figure 13A:
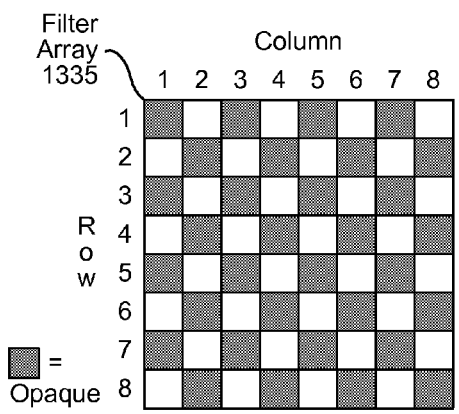
FIGS. 13A to 15B illustrate alternative filter arrays.
Figure 13B:
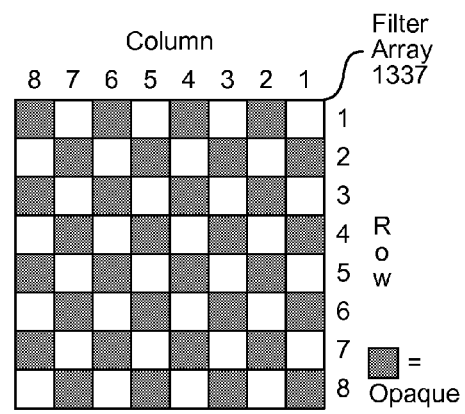

As illustrated in FIGS. 13A and 13B, the filter array 1335 on the front side of the sensor 112 allows light to pass through some elements (illustrated as white elements) and blocks the passage of light through other elements (illustrated as grey elements). The arrangement of array elements in filter array 1337 allows light to reach the photodetectors blocked by filter array 1335, and blocks light to photodetectors where 1335 allows the passage of light. The filter elements that "block" light are substantially opaque to at least incident wavelengths to which the image sensor 112 is sensitive. The filter elements that "pass" light are substantially transparent at the wavelengths that are passed (and to which the image sensor 112 is sensitive), but may attenuate other wavelengths.

Figure 14A:
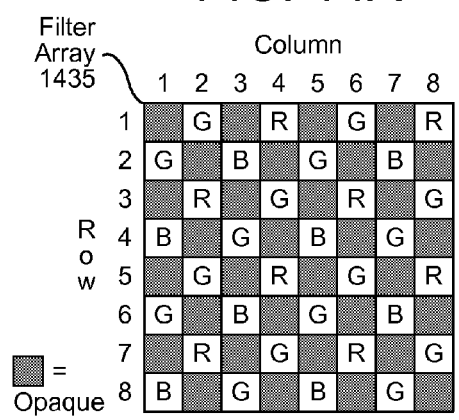
Figure 14B:
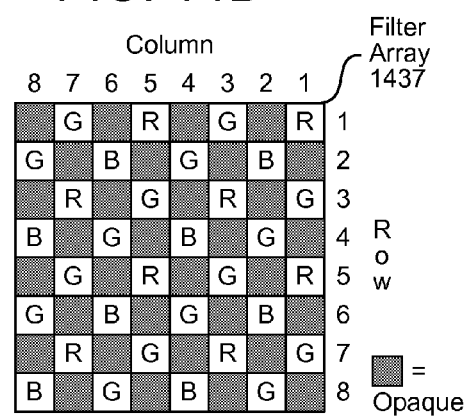
Figure 15A:
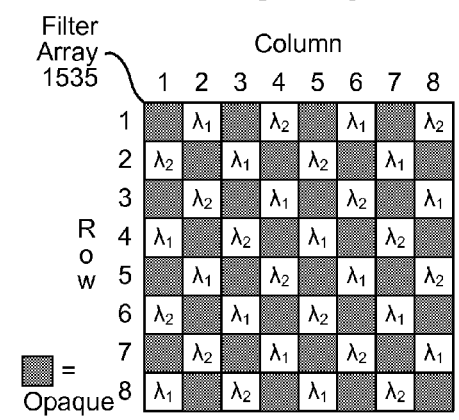
Figure 15B:
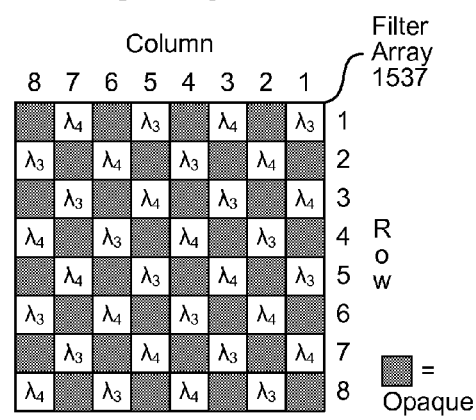

Using filter arrays 1335 and 1337 in FIGS. 13A and 13B, each side of the imaging system would produce a black-and-white image, absent additional filtering. FIGS. 14A and 14B illustrate a front-side filter array 1435 and a back side filter array 1437 that include red, green, and blue filter elements, such that the composite image data can be separated to create discrete "left" and "right" full color images that were simultaneously captured. The front side array 1535 in FIG. 15A and back side array 1535 in FIG. 15B produce the same results from system 500 as illustrated in FIGS. 8A and 8B, but without requiring the filters 534 and 536.

Figure 16:
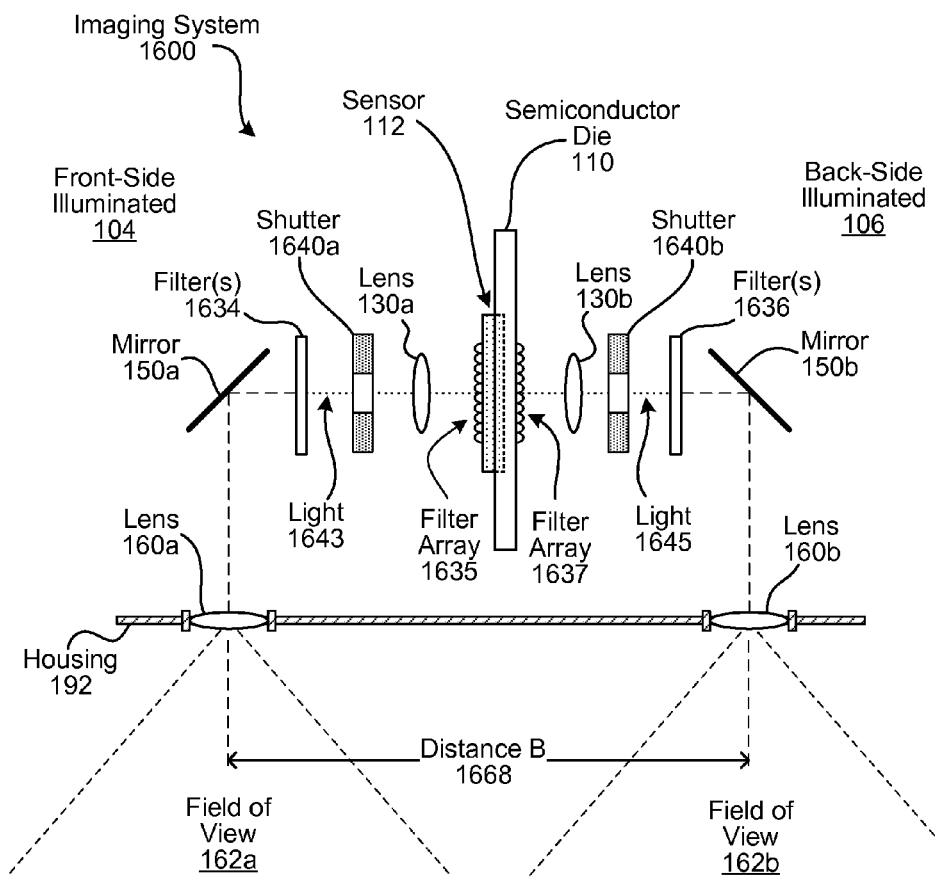
FIG. 16 illustrates a system similar to that in FIGS. 1, 5, and 10 that includes shutters.

FIG. 16 illustrates a system 1600 based on the other systems already described, but which adds shutters 1640a and 1640b to each side of the sensor 112 The arrangement of filters 1634 and 1636, and filter arrays 1635 and 1637 may be any of those already described. Since image data is simultaneously acquired from each side of the systems, a simulated electronic shutter may be used, where exposure time is controlled based on when the image sensor photodetectors are reset, and when their data is read. However, physical shutters 1640a and 1640b may optionally be included.

Any kind of physical shutter may be used as shutters 1640a and 1640b, such as mechanical shutters and electronic shutters (e.g., liquid crystal shutters). If a liquid crystal shutter is used, it may result in linearly polarized light. If so, the orientation of the shutter polarization may rotated ninety degrees so that the polarization of light captured by one side of the sensor is perpendicular to the other, eliminating the need for separate polarizing filters 1034 and 1036 (as illustrated with the system 1000).

Other components may be included in the imaging system 1600 (e.g., systems 100, 500, 1000, etc.), such as additional filters, additional optics, and electromechanical elements (e.g., electromechanical elements to modify zoom or focus). As illustrated, the mirrors 150a, 150b are angled at forty-five degrees. Other structures may be used to redirect the optical path instead of mirrors 150a, 150b, such as reflective prisms.

Unfiltered, conventional image sensors can capture both visible light and infrared. Some image sensors can also capture some of the ultraviolet spectrum. Examples of additional filters that the system may include are a high-pass filter to attenuate infrared (passing visible light, which is composed of light having higher frequencies than infrared) and a low-pass filter to attenuate ultraviolet (passing visible light, which is composed of light having lower frequencies than ultraviolet), if ultraviolet and infrared light are unwanted wavelengths.

Although several of the examples have been in terms of image data for visible light, the filters and filter arrays may be configured to pass light of other wavelengths, such as infrared. Infrared filters and visible light filters may also be mixed, with some filter elements passing visible wavelengths and some filter elements passing infrared wavelengths. Infrared filters and filter elements attenuate visible light, but allow light in a portion of the infrared spectrum to pass through.

As arranged in FIG. 16, depending in part on the overlap of the fields-of-view 162a and 162b facing in a same direction, the imaging system 1600 can be used for stereoscopic photography. Stereoscopic photography captures two images with a parallax that provides "binocular disparity," simulating human vision by positioning the cameras to have a spatial relationship approximately the same as the left and right eyes on a human head (binocular disparity distance "B" 1668), and providing similar overlap in the fields of view 162a, 162b (in comparison to human vision).

The two outer lenses 160a and 160b, in addition to being spatially offset by the binocular disparity distance "B" 1668 apart, are in a same plane. The optical path length for light passing through the front-side of the system to the active area of the image sensor 112 and the optical path length for light passing through the back-side of the system to the active area of the image sensor 112 may be equal or close to equal, where an "optical path length" is the product of the geometric length of the path light follows through the system and the index of refraction of the mediums through which it propagates.

Human eyes are horizontally separated by about fifty to seventy eight millimeters (inter-pupillary distance (IPD) between centers of each pupil), with binocular disparity distance 1668 separating lens 160a and lens 160b corresponding to this IPD range (i.e., fifty to seventy eight millimeters, lens-center to lens-center). The IPD mean value is approximately sixty two millimeters for females, and sixty five millimeters for males, such that the binocular disparity distance 1668 in the range of sixty two to sixty five millimeters may be statistically advantageous. If the optics on both sides of the sensor 112 provide a similar depth of field and focus, then by capturing offset viewpoints of a same scene, a stereoscopic perspective of the scene can be generated, with the overlapping fields of view 162a, 162b provide a parallax similar to human vision.

By including a filter and/or filter arrays on one side of the system to pass infrared light, or visible light without color registration (i.e., no color filter, resulting in black-and-white grayscale image data), and capturing color data from the other side of the system, and by applying edge detection algorithms to the infrared or unfiltered side, the contrast of edges between front side and back side image may be used to determine the shape of an object or the distance to an object. For example, by looking at two edges of a same object in both front-side derived image data and back-side derived image data, changes between the edges can be used to approximate a change in distance to the object.

Figure 17:
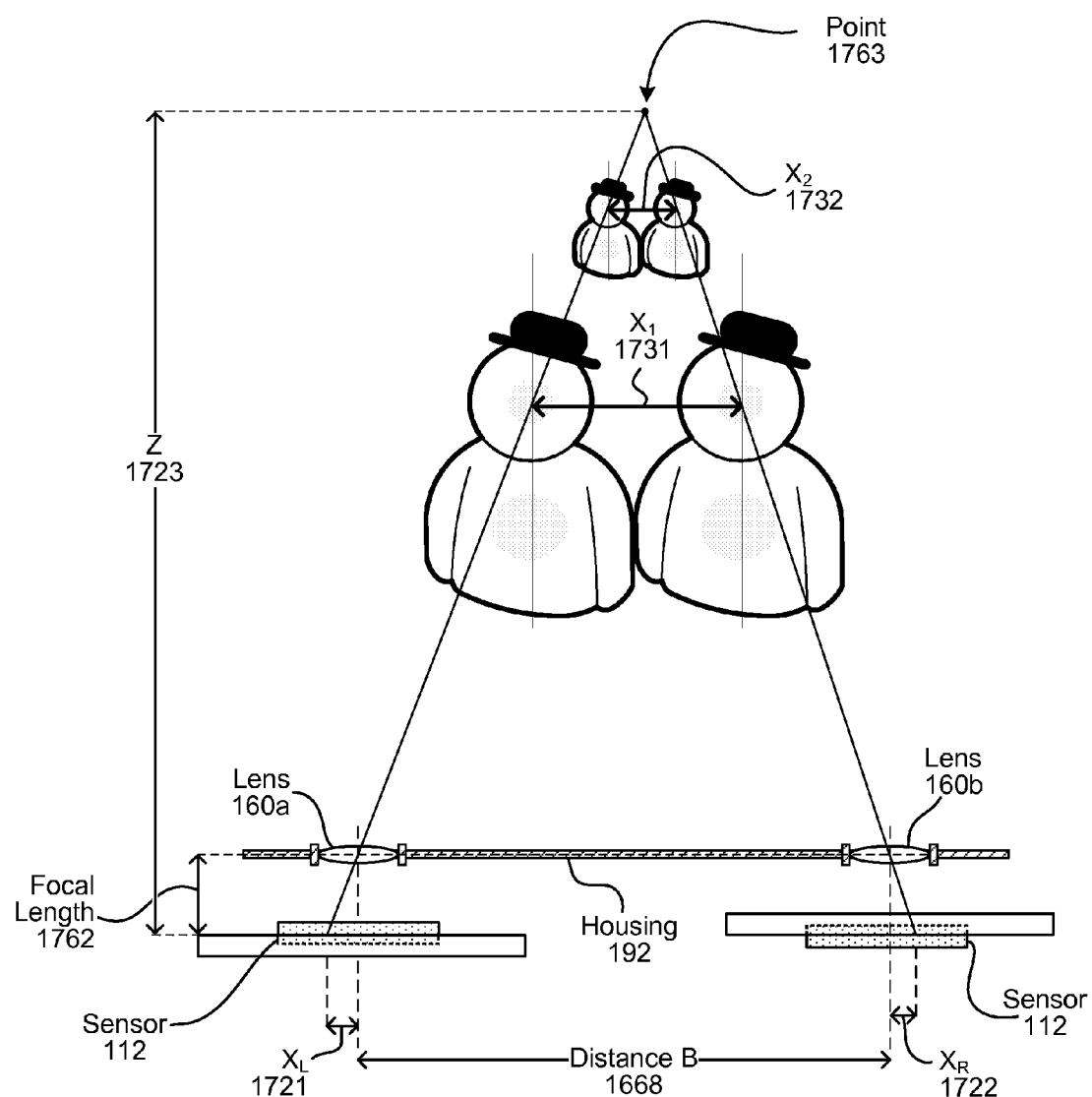
FIG. 17 illustrates geometries that may be used to determine the distance to an object using the left and right images.

For example in FIG. 17, image data is captured by exposing both sides of the image sensor 112. Due to parallax produced by lens separation (distance 1668), a captured object is offset by a distance $X_1$ (1731) due to the difference in the perspectives recorded in the image data from the front side and the image data from the back side. This shift in the object (or edges, or other features, etc.) between sides can be used as a basis for depth measurements.

The disparity between the images is the difference between $X_L$ (1721) and $X_R$ (1722). The disparity is large when the object is closer, and smaller when the object is further, corresponding to the change in offset $X_1$ (1731) from a first pair of images and offset $X_2$ (1732) from a second pair of images. The offset is not perceptible at and beyond the "vanishing point."

By calculating the distance Z (1723) to the point 1763, the approximate distance to the actual object may be approximated from the image disparity. Using the focal length "f" (1762) from the outer lenses 160a, 160b to the active area of the image sensor, disparity may be determined as:

$$Z = \frac{Bf}{X_L - X_R} \quad (2)$$

where B is binocular disparity distance (1668). As B and f are predetermined for the optical system, and $X_L$ and $X_R$ may be determined from the image data, the distance to the object Z may be solved for as:

$$\text{disparity} = X_L - X_R = \frac{Bf}{Z} \quad (1)$$

The example in FIG. 17 uses a same focal length "f" (1762) for the front side and back side optical systems. The actual focal length (i.e., the optical path length) may be configured to be approximately the same for both the front side and the back side. Difference in focal length may occur on opposite sides due to differences in refractive indexes of any filters, different geometric path lengths, and the difference in refractive indexes between the surface layers of the sensor 112 from the front side versus the refractive index of the semiconductor die from the backside. In the alternative to engineering the front side and back side optical systems so that the focal lengths are the same on both sides, differences may be adjusted for mathematically, or ignored entirely (an increase in the difference in the optical path lengths resulting in an increase in the probability of error in the distance approximation, if the difference is ignored). The distance approximation Z (1723) may be used, for among other things, controlling autofocus mechanisms.

As noted, the wavelengths registered by the filter and filter arrays on each side may be different. For example, one side may acquire color data and the other side may acquire infrared data. While side-dependent data may be extracted from the composite image data (i.e., front side image data and back side image data) and used for distance calculations, in some applications an output image may be based solely on image data from one side or the other, or may be an enhanced image using data from both side. The difference in parallax between perspectives may be corrected computationally during processing, so that the data from both side may be used to form a single image.

For some applications, both sides may configured to capture infrared images. For example, for use in diagnostic equipment for infrared thermography and thermal imaging, one side may include a filters and/or filter arrays tuned to a portion of the infrared spectrum, whereas the other side has a filters and/or filter arrays tuned to a different portion of the infrared spectrum. For infrared thermography applications, a useful range of coverage for the two filter arrays is infrared wavelengths from approximately nine to fourteen microns. So for example, referring to filter arrays 535, 537, 1535, and 1537, the array elements may pass infrared bands centered at $\lambda_1$=9.625 microns, $\lambda_2$=10.875 microns, $\lambda_3$=12.125 microns, and $\lambda_4$=13.375 microns. By combining images captured by opposite sides of the system, a single image sensor may be used to cover the electromagnetic spectrum commonly associated with thermography, providing improved temperature differentiation and wide-band thermography. Other wavelength ranges may also be used, and an individual filter array may have filter array elements spanning fewer or more wavelength bands.

As noted above, the wavelengths transmitted by different filters, filter array elements, and filter-filter array element combinations may be configured to partially overlap (e.g., overlap of Gaussian-curve wavelength sensitivities), with the degree of overlap depending upon, among other things, the choice of filter element materials and the desired dynamic range of the imaging system. By tuning the sides to span different portions of the infrared spectrum, image data recording incident infrared light may be used to approximate a temperature of a radiating object based on the object's black-body radiation characteristics. Black-body radiation has a characteristic, continuous frequency spectrum that depends only on the body's temperature, called the Planck spectrum or Planck's law. The spectrum is peaked at a characteristic frequency that shifts to higher frequencies with increasing temperature, and at room temperature most of the emission is in the infrared region of the electromagnetic spectrum. By calibrating each side of the imaging system, an approximate temperature of imaged objects may be determined. In the alternative, the infrared filters, filter arrays, and combinations thereof on both sides of the image sensor 112 may be arranged to expose the sensor to the same portions of the infrared spectrum, to generate a stereoscopic thermograph, such as by using polarizing filters to differentiate sides as discussed with system 1000, or opaque filters as discussed with FIGS. 13A to 13B.

If one side of the image sensor is being used to capture infrared and the other side is not, it may be preferable to use the front-side illuminated 104 side of the sensor for the infrared. Although a thinning of the back side of the wafer that may be performed during manufacturing after forming the image sensor 112 may reduce noise resulting from infrared energy on the back side to acceptable levels, there is still an increased likelihood of noise being generated by infrared energy on the back side in comparison to the front side. Even so, either side may be used for either color or infrared.

When using the system for stereoscopic photography, the image sensor may be calibrated to balance out differences in color ratios and brightness from one side to the other (and from one filter element to another). This may be done before or after the image sensor 112 is installed in a device, and application of the calibration coefficients may be performed by programmable logic included on the same die as the image sensor. An alternative solution is to store the calibration coefficients in a nonvolatile memory included on the die, to be accessed by a processor to perform calibration.

An electromechanical zoom mechanism may be integrated with each of the outer lenses 160*a*, 160*b*. Similarly, a focusing mechanism (e.g., moving optics and motor) may be integrated to move both of the inner lenses 130*a*, 130*b* and/or the outer lenses 160*a*, 160*b*, or some other refractive optical component(s) to adjust focus. The optics on the front-side and the back-side may be configured the same, or may be different.

The "ultraviolet spectrum" or "ultraviolet light" refers to the portion of the electromagnetic spectrum with a wavelength shorter than that of visible light, but longer than X-rays, that is, in the range between four hundred nanometers and one hundred nanometers. It is so-named because the spectrum consists of electromagnetic waves with frequencies higher than those that humans identify as the color violet.

The "visible spectrum" or "visible light" refers to the portion of the electromagnetic spectrum that is visible to the human eye. A typical human eye will respond to wavelengths from about three-hundred ninety to seven hundred nanometers, which in terms of frequency, corresponds to a band in the vicinity of four hundred thirty to seven hundred ninety terahertz.

"Infrared," the "infrared spectrum," or "infrared light" refers to the portion of the electromagnetic spectrum that extends from about seven hundred nanometers to one millimeter. This range of wavelengths corresponds to a frequency range of approximately four hundred thirty terahertz to three hundred gigahertz. Most of the thermal radiation emitted by objects near room temperature is infrared.

The image sensor 112 may be a complementary metal-oxide semiconductor (CMOS) sensor, and the semiconductor die 110 may be silicon. Existing CMOS sensor designs are readily adaptable to serve as dual-sided sensors. So long as the sensor technology can be modified to allow light to reach pixels from both sides of a sensor, the principles discussed above may be applicable to other sensor technologies besides CMOS.

Also, while a CMOS silicon image sensor can ordinarily sense light across an entirety of the visible spectrum, it may only be able to sense part of the infrared spectrum. Semiconductor materials other than silicon may be used as the substrate and to fabricate the sensors (e.g., III-V semiconductors), depending upon the range of wavelengths to be sensed, so long as the material accommodates the construction of sensors covering the portions of the electromagnetic spectrum to be captured, and does not appreciably attenuate the wavelengths to be captured by back-side illumination.

Although the filter elements of the arrays are illustrated in an alternating interleaved pattern, other configurations are possible, such as alternating vertical stripes of array elements (e.g., alternating stripes of elements 171*a*/b and 172*a*/b), alternating horizontal stripes, etc.

The mirrors 150*a* and 150*b* may be tuned to the wavelengths to be reflected. However, most conventional mirrors reflect both visible light and at least a portion of the infrared spectrum.

A device including any of the above described systems may also include one or more light emission sources to illuminate a scene at wavelengths corresponding to the wavelengths to be captured by the image sensor. For example, the device may include a white source light such as a white light emitting diode (LED) if the image sensor is to capture a color or black-and-white image (e.g., a white LED flash), and an infrared light source such as an infrared LED if the image sensor is to capture an infrared image.

Depending in part on the portions of the electromagnetic spectrum (i.e., different wavelengths of light) being recorded and the sensitivity of the image sensor 112 to those wavelengths, if mechanical shutters 1640*a*, 1640*b* are included in the system, the duration the shutter is open on one side of the image sensor (i.e., exposure time) may be different than the duration the other shutter is open. Conventional shutter-control algorithms may be used to automatically and independently control each shutter.

Figure 18:
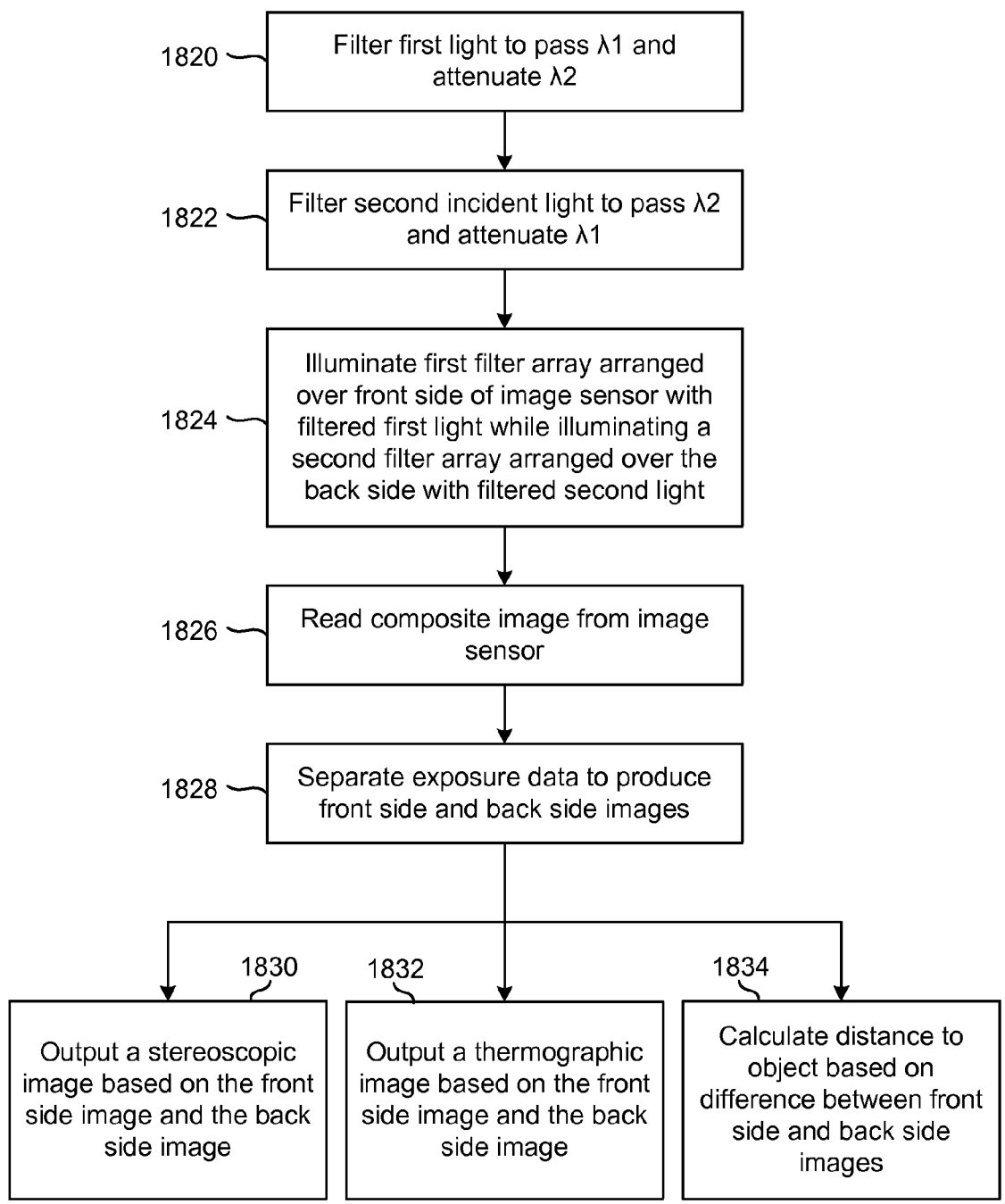
FIG. 18 illustrates a process for capturing images using both the front-side and back-side of a single image sensor based on the structures of the systems in FIGS. 1 through 9.

FIG. 18 illustrates a process based on the systems describe in conjunction with FIGS. 1 to 9. Incident "first" light is filtered (1820) filtering incident first light to include a first wavelength band of light and to substantially attenuate a second wavelength band of light (e.g., $\lambda_1$ light 143 in FIG. 1). Incident "second" light is filtered (1822) to include the second wavelength band of light and to substantially attenuate the first wavelength band of light (e.g., $\lambda_2$ light 145 in FIG. 1). Steps 1820 and 1822 are performed at a same time, but if physical shutters 1640*a* and 1640*b* are included in the system one exposure (and the duration of filtering) on one side of the image sensor 112 may be short than the other. Exposure durations may be different, for among other reasons, to avoid saturating the photodetectors receiving first wavelength before the exposure is complete for the second wavelength (and vice versa).

A first filter array (e.g., 135, 535) is arranged over the front side of the image sensor and a second filter array (e.g., 137, 537) is arranged over the back side of the image sensor. The first filter array is illuminated (1824) with the filtered first light at a same time that the second filter array is illuminated with the filtered second light.

Both of the first filter array and the second filter array include first filter elements (e.g., 171*a*, 171*b*, 671*a*, 671*b*, 971*a*, 971*b*) arranged to filter light incident on a first plurality of photodetectors of the image sensor 112. The first filter elements are configured to pass the first wavelength band of light (e.g., $\lambda_1$) and to substantially attenuate the second wavelength band of light (e.g., $\lambda_2$).

Both of the first filter array and the second filter array also include second filter elements arranged to filter light incident on the second plurality of photodetectors. The second filter elements are configured to pass the second wavelength band of light and substantially attenuate the first wavelength band of light.

The composite image data is read (1826) from the first and second pluralities of photodetctors, and then separated (1828) to produce front side and back side image data corresponding to images from the differing perspectives of the two outer lens 160a, 160b.

Once separated, a stereoscopic image may be output (1830) based on the front side image and the back side image providing left-eye and right-eye perspectives, as discussed in conjunction with FIG. 16. A thermographic image may be output (1832) either by correcting for parallax and combining the corrected front-side and back-side images, or outputting the front side and back side images as a stereoscopic thermographic image (e.g., 1830). Temperature information may be determined based on black body radiation values to be included in the thermographic image. A distance may be calculated (1834) from the difference in perspectives between the front side and back side images, as discussed in conjunction with FIG. 17. The distance may be used for, among other things, adjusting focus of the device.

The process illustrated in FIG. 18 is readily adapted to the systems described in conjunction with FIGS. 10 to 12B by replacing the wavelength bands with first and second polarizations that are perpendicular to each other. The process may be adapted to use the partially opaque filter arrays (e.g., 1335, 1337, 1435, 1437, 1535, 1537) discussed in conjunction with FIGS. 13A to 15B by (optionally) omitting the filtering steps (1820, 1822). Using the polarizing filters and filter arrays, or opaque filter arrays (with or without additional filters), the light that illuminates the front side and the back side in step 1824 may comprise the same wavelengths or different wavelengths.

Figure 19:
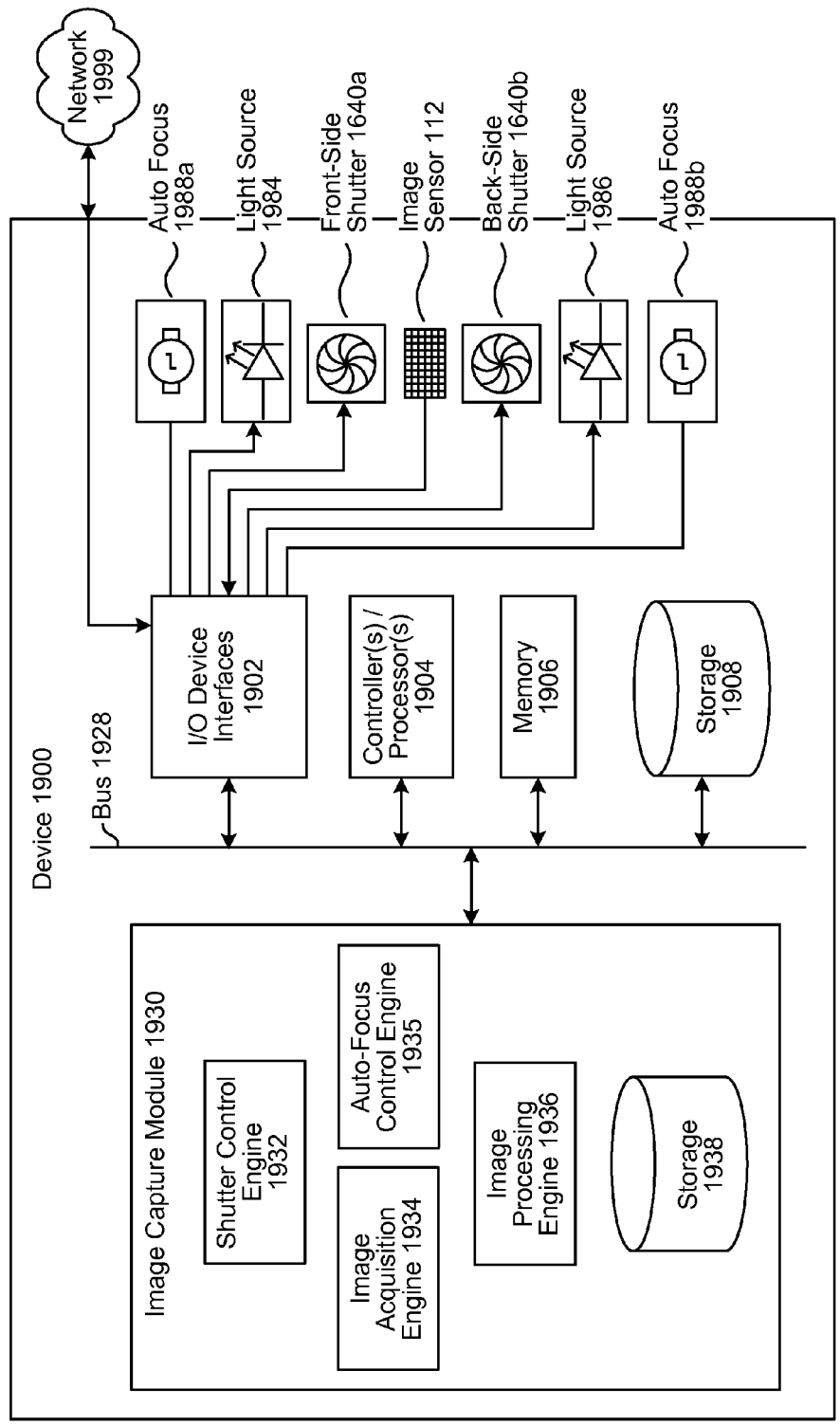
FIG. 19 is a block diagram conceptually illustrating example components of a device.

FIG. 19 is a block diagram conceptually illustrating example components of a device 1900 including the double-sided image sensor 112. In operation, the device 1900 may include computer-readable and computer-executable instructions that reside in memory 1906 and/or storage 1908/1938, as will be discussed further below.

Static components of the optical systems such as mirrors and filters are omitted from FIG. 19. Although components of an auto-focus system are illustrates, other optional dynamic elements such as zoom control are omitted, but operation of such elements is well known in the art. Although illustrated as an auto-focus system, device 1900 may be auto-focus, manual, or fixed focus.

The device 1900 includes input/output (I/O) device interfaces 1902 that support a variety of input and output components. Such components include the image sensor 112, the front-side shutter 140a, the back-side shutter 140b, a first light source 1984 for use with the front-side, a second light source 1986 for use with the back-side, a front-side illumination auto focus mechanism 1988a, and a back-side illumination auto-focus mechanism 1988b. Although the shutters 140a, 140b in FIG. 19 are illustrated as mechanical shutters, electronic shutters such as liquid crystal shutters may be used instead. As noted above, a simulated electronic shutter may also be used, such that shutters 140a, 140b may be omitted. The first light source 1984 emits light of a wavelength or range of wavelengths that will pass through the front-side filter(s) and/or filter elements to illuminate a front side of the image sensor, and may be used as a flash or similar illumination. Likewise, the second light source 1986 emits light of a wavelength or range of wavelengths that will pass through the back-side filter(s) and/or filter elements to illuminate a back side of the image sensor, and may be used as a flash or similar illumination. As discussed above, the wavelengths emitted by the first and second light source 1984, 1986 may be different, such as one emitting white light and the other infrared, or both emitting infrared (e.g., same spectra or emitting in different parts of the infrared spectrum), depending on the configuration.

The I/O device interfaces 1902 may also provide wired or wireless connectivity to connect to external components and/or a network 1999, such as providing wired connectivity via a universal serial bus (USB) and/or Ethernet port, and/or wireless connectivity for a wireless local area network (WLAN) (such as WiFi) radio, Bluetooth, a Long Term Evolution (LTE) network, WiMAX network, 3G network, etc. In addition to the wired ports and wireless connectivity, one or more ports may be provided for a memory card (not illustrated), such as CompactFlash and Secure Digital (SD) cards.

The I/O device interfaces 1902 may support a wide variety of other input and output components, in addition to those illustrated.

The device 1900 may include an address/data bus 1928 for conveying data among components of the device 1900. Each component within the device 1900 may also be directly connected to other components in addition to (or instead of) being connected to other components across the bus 1928.

The device 1900 may include one or more controllers/processors 1904, that may each include a central processing unit (CPU) for processing data and computer-readable instructions, and a memory 1906 for storing data and instructions. The memory 1906 may include volatile random access memory (RAM), non-volatile read only memory (ROM), non-volatile RAM and/or other types of memory. The device 1900 may also include a data storage component 1908, for storing data and controller/processor-executable instructions (e.g., instructions to perform steps 122 to 126 in FIG. 1 and steps 1820 to 1834 in FIG. 18, and to perform the distance calculations discussed with FIG. 17). The data storage components 1908 and 1938 are of a non-volatile storage type such as optical, magnetic, or solid-state storage (e.g., Flash, magnetoresistive, phase-change). In addition, a portion of data storage component may be external to or added to the device 1900, such as storage connected via the USB or Ethernet port, or as a memory card.

Computer instructions for operating the device 1900 and its various components may be executed by the controller(s)/processor(s) 1904, using the memory 1906 as temporary "working" storage at runtime. The computer instructions may be stored in a non-transitory manner in non-volatile memory 1906 or storage 1908/1938. Alternatively, some or all of the executable instructions may be embedded in hardware or firmware in addition to or instead of software.

The device 1900 further includes an image capture module 1930 that manages image acquisition and processing.

A shutter control engine 1932 of the image capture module 1930 controls the timing of the resetting and reading of the image sensor 112 is a simulated shutter is used, and controls operation of shutters 140a and 140b if physical shutters are used. The shutter control engine 1932 works in coordination with the image acquisition engine 1934 to control exposure duration, and may verify that image data to be recorded from the image sensor 112 has been fully offloaded from the sensor and that the image sensor 112 has been reset before permitting another exposure.

The image acquisition engine 1934 controls conventional operations, such as exposure duration and picture type (e.g., one image, stereoscopic, video capture, etc.). The image acquisition engine 1934 may work in coordination with auto-focus control engine 1935, which controls the front side and back side auto-focus mechanisms 1988a, 1988b. If a distance calculation is performed as discussed with FIG. 17 (e.g., determining distance to an object in a center of the frames to adjust focus for a subsequent exposure) and step 1834 in FIG. 18, that calculation may be performed by the auto-focus control engine 1935.

When image data is to be recorded, the image acquisition engine offloads the image data from the image sensor 112 into memory 1906 and/or storage 1908/1938, and may reset the image sensor. The image acquisition engine may be specialized, may be of a conventional design used with dual-camera devices modified to acquire stereoscopic images, or some combination thereof. The image acquisition engine 1934 may determine whether the first light source 1984 or second light source 1986 is needed, and based on that determination, the activation of the respective light source may be controlled by either the shutter control engine 1932 (to insure that the timing of the illumination synchronizes with shutter operation) or by image acquisition engine 1934 itself.

The image processing engine 1936 may separate image data acquired from the front side and image data acquired from the back side to generate discrete front-and-back image data. The image processing engine 1936 also formats recorded image data, such as converting a captured image data into, among other things, a "JPEG" (Joint Photographic Experts Group), bitmap, "TIFF" (Tagged Image File Format), and/or raw image, into an "MPEG" (Moving Pictures Expert Group) or HEVC (High Efficiency Video Coding) video format, and/or wrapping/bundling data into videos or other multiple-image formats.

If calibration of the front and back sides of the image sensor 112 is performed by the device 1900, the image acquisition engine 1934 may compare front-side and back-side images and calculate calibration coefficients. The calibration coefficients may then be stored in storage 1938, and used by image process engine 1936 when processing images. If calibration is done prior to the integration of the sensor 112 into the device 1900, the calibration coefficients may also be stored in storage 1938.

As noted above, programmable logic and nonvolatile memory may be fabricated on the dies, together with the image sensors. Some or all of the engines of image capture module 1930, as well as the I/O device interfaces 1902, controller(s)/processor(s) 1904, memory 1906 may be integrated on the semiconductor die 110 with the image sensor 112. Any type of programmable logic may be included (e.g., an application specific integrated circuit (ASIC), a microprocessor, a field programmable gate array (FPGA), etc.). Shutter control engine 1932 may be implemented, among other ways, as a state machine. Some or all of storage 1908/1938 may also be integrated on the semiconductor die 110 as solid-state memory (e.g., Flash, magnetoresistive random access memory (MRAM)) and/or read-only memory. The calibration coefficients and software/firmware-based executable instructions used by the programmable logic (if any) may be stored on-die.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of electro optics, optical sensors, optics, digital cameras, and infrared and stereoscopic photography should recognize that components and process steps described herein may be interchangeable with other components or steps, or combinations of components or steps, and still achieve the benefits and advantages of the present disclosure. For example, in each of the illustrated imaging systems (100, 500, 1000, 1600), optical components may be arranged in a different, such as the position of the filters relative to the mirror. As another example, the optical components on one side of the sensor 112 may be different than the optical components on the other. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A device, comprising:
    an image sensor having a front side and a back side, the back side being opposite the front side, with the image sensor configured to be illuminated from the front side and configured to be illuminated from the back side;
    a first lens exposed to an exterior of the device to transmit incident light from the exterior of the device to the front side of the image sensor;
    a second lens exposed to the exterior of the device to transmit incident light from the exterior of the device to the back side of the image sensor, the second lens arranged in a same plane as the first lens;
    a first filter array comprising a first plurality of filter elements disposed between the first lens and the front side of the image sensor, and arranged to transmit light to the image sensor, the first plurality of filter elements comprising first filter elements and second filter elements;
    a second filter array comprising a second plurality of filter elements disposed between the second lens and the back side of the image sensor, and arranged to transmit light to the image sensor, the second plurality of filter elements comprising the first filter elements and the second filter elements; and
    a controller configured to:
        read composite image data from the image sensor resulting from exposing the image sensor to light on the front side and the back side at a same time;
        extract first image data from the composite image data, comprising image data resulting from the exposing the front side of the image sensor; and
        extract second image data from the composite image data, comprising image data resulting from the exposing the back side of the image sensor,
        wherein the first image data and the second image data correspond to different perspectives of a same scene.

2. The device of claim 1, wherein the first plurality of filter elements are arranged as a mirror-image of the second plurality of filter elements, the device further comprising:
    a first filter that allows a first wavelength band of light to pass through to illuminate the first filter array and that substantially attenuates a second wavelength band of light; and a second filter that allows the second wavelength band of light to pass through to illuminate the second filter array and that substantially attenuates the first wavelength band of light, wherein the first filter elements of the first and second filter arrays are configured to pass the first wavelength band and to substantially attenuate the second wavelength band, and the second filter elements are configured to pass the second wavelength band and to substantially attenuate the first wavelength band, the first image data is based on light received by the image sensor in the first wavelength band, and the second image data is based on light received by the image sensor in the second wavelength band.

3. The device of claim 1, wherein:

the first filter elements transmit incident light and the second filter elements are opaque to incident light, the first filter elements of the first filter array transmit incident light to illuminate a first set of photodetectors of the image sensor, and the second filter elements of the first filter array block incident light to a second set of photodetectors of the image sensor, the first filter elements of the second filter array transmit incident light to illuminate the second set of photodetectors of the image sensor, and the second filter elements of the second filter array block incident light to the first set of photodetectors of the image sensor, the first image data is based on light received by the first set of photodetectors, and the second image data is based on light received by the second set of photodetectors.

4. A system comprising:

an image sensor, the image sensor comprising a front side and a back side, the back side being opposite the front side, with the image sensor configured to be illuminated from the front side and configured to be illuminated from the back side;

a first lens arranged to direct light to illuminate the front side of the image sensor;

a second lens arranged to direct light to illuminate the back side of the image sensor;

a first filter array disposed between the first lens and the front side of the image sensor and comprising first filter elements arranged to transmit light to the image sensor;

a second filter array disposed between the second lens and the back side of the image sensor and comprising second filter elements arranged to transmit light to the image sensor; and a controller configured to:
read composite image data from the image sensor, the composite image data resulting from exposing the front side and the back side of the image sensor to the light at substantially a same time;
extract first image data from the composite image data, the first image data comprising image data resulting from the exposing the front side of the image sensor; and
extract second image data from the composite image data, the second image data comprising image data resulting from the exposing the back side of the image sensor.

5. The system of claim 4, wherein:

the first filter array is arranged as a mirror-image of the second filter array, the first filter elements of the first filter array are configured to pass a first wavelength band of light and to substantially attenuate a second wavelength band of light, the second filter elements of the second filter array are configured to pass the second wavelength band and to substantially attenuate the first wavelength band, the first image data is based on light received by the image sensor in the first wavelength band, and the second image data is based on light received by the image sensor in the second wavelength band.

6. The system of claim 5, further comprising:

a first filter that allows the first wavelength band to pass through to illuminate the first filter array, and that substantially attenuates the second wavelength band; and a second filter that allows the second wavelength band to pass through to illuminate the second filter array, and that substantially attenuates the first wavelength band.

7. The system of claim 4, further comprising:

a first polarizing filter that allows light having a first polarity to pass through to illuminate the front side of the image sensor, and that blocks light having a second polarity that is perpendicular to the first polarity; and a second polarizing filter that allows light having the second polarity to pass through to illuminate the back side of the image sensor, and that blocks light having the first polarity, wherein the first filter array is arranged as a mirror-image of the second filter array, the first filter elements are configured to pass light having the first polarity and to block light having the second polarity, the second filter elements are configured to pass light having the second polarity and to block light having the first polarity, the first image data is based on light received by the image sensor with the first polarity, and the second image data is based on light received by the image sensor with the second polarity.

8. The system of claim 4, the first filter array further comprising third filter elements and the second filter array further comprising fourth filter elements, wherein:

the first filter elements of the first filter array transmit incident light to illuminate a first set of photodetectors of the image sensor, the second filter elements of the second filter array transmit incident light to illuminate a second set of photodetectors of the image sensor, the third filter elements of the first filter array block incident light from reaching the second set of photodetectors of the image sensor, the fourth filter elements of the second filter array block incident light from reaching the first set of photodetectors of the image sensor, the first image data is based on light received by the first set of photodetectors, and the second image data is based on light received by the second set of photodetectors.

9. The system of claim 8, wherein, at least one of the first filter elements and at least one of the second filter elements passes incident light in a first wavelength band and substantially attenuates incident light in a second wavelength band.

10. The system of claim 4, wherein:

the first lens and the second lens are arranged in a same plane and a spatial separation between the first lens and the second lens is between fifty and seventy eight millimeters as measured from centers of each lens, and the controller is further configured to output a stereoscopic image based on the first image data and the second image data.

11. The system of claim 4, further comprising:
a first shutter arranged to selectively pass light to illuminate the front side of the image sensor;
a first mirror disposed between the first lens and the front side of the image sensor to redirect light to illuminate the front side of the image sensor;
a second shutter arranged to selectively pass light to illuminate the back side of the image sensor; and
a second mirror disposed between the second lens and the back side of the image sensor to redirect light to illuminate the back side of the image sensor.

12. The system of claim 4, the controller further configured to calculate a distance to an object based on a difference in perspective between the first image data and the second image data.

13. The system of claim 4, wherein:
the first filter elements are configured to substantially attenuate visible light and to allow infrared light of a first portion of an infrared spectrum to pass through;
the second filter elements are configured to substantially attenuate visible light and to allow infrared light of a second portion of an infrared spectrum to pass through;
the first image data is based on light received by the image sensor in the first portion of the infrared spectrum;
the second image data is based on light received by the image sensor in the second portion of the infrared spectrum; and
the controller is further configured to combine the first image data and the second image data to provide a thermographic image.

14. A method of operating a device, comprising:
illuminating a first plurality of photodetectors of an image sensor from a front side of the image sensor and a second plurality of photodetectors of the image sensor from a back side of the image sensor at a same time;
reading the first and second pluralities of photodetctors as composite image data; and
separating the composite image data into first image data and second image data, wherein the composite image data corresponding to the exposing of the front side of the image sensor is included in the first image data, and the composite image data corresponding to the exposing of the back side of the image sensor is included in the second image data.

15. The method of claim 14, wherein illuminating the first and second pluralities of photodetectors comprises:
filtering incident first light to include a first wavelength band of light and to substantially attenuate a second wavelength band of light;
filtering incident second light to include the second wavelength band of light and to substantially attenuate the first wavelength band of light;
illuminating a first filter array arranged over the front side of the image sensor with the filtered first light;
illuminating a second filter array arranged over the back side of the image sensor with the filtered second light;
wherein both of the first filter array and the second filter array comprise:
first filter elements arranged to filter light incident on the first plurality of photodetectors, the first filter elements configured to pass the first wavelength band of light and to substantially attenuate the second wavelength band of light, and
second filter elements arranged to filter light incident on the second plurality of photodetectors, the second filter elements configured to pass the second wavelength band of light and substantially attenuate the first wavelength band of light.

16. The method of claim 14, wherein illuminating the first and second pluralities of photodetectors comprises:
filtering incident first light to include light having a first polarity and to substantially attenuate light having a second polarity perpendicular to the first polarity;
filtering incident second light to include light having the second polarity and to substantially attenuate light having the first polarity;
illuminating a first filter array arranged over the front side of the image sensor with the filtered first light;
illuminating a second filter array arranged over the back side of the image sensor with the filtered second light;
wherein both of the first filter array and the second filter array comprise:
first filter elements arranged to filter light incident on the first plurality of photodetectors, the first filter elements configured to pass the first polarity of light and to substantially attenuate the second polarity of light, and
second filter elements arranged to filter light incident on the second plurality of photodetectors, the second filter elements configured to pass the second polarity of light and to substantially attenuate the first polarity of light.

17. The method of claim 14, wherein illuminating the first and second pluralities of photodetectors comprises:
illuminating a first filter array arranged over the front side of the image sensor with the filtered first light; and
illuminating a second filter array arranged over the back side of the image sensor with the filtered second light,
wherein first filter elements of the first filter array arranged over the first plurality of photodetectors pass incident light and second filter elements of the first filter array arranged over the second plurality of photodetectors block incident light, and
third filter elements of the second filter array arranged over the second plurality of photodetectors pass incident light and fourth filter elements of the second filter array arranged over the first plurality of photodetectors block incident light.

18. The method of claim 14, further comprising:
outputting a stereoscopic image based on the first image data and the second image data.

19. The method of claim 14, further comprising:
calculating a distance to an object based on a difference in perspective between the first image data and the second image data.

20. The method of claim 19, further comprising:
adjusting an optical focus of the device based on the calculated distance.

21. The method of claim 14, further comprising:
outputting at least one thermographic image based on the first image data and the second image data.

* * * * *